(12) United States Patent
Papaioannou

(10) Patent No.: US 6,477,542 B1
(45) Date of Patent: Nov. 5, 2002

(54) DEVICE FOR LOCATION-DEPENDENT AUTOMATIC DELIVERY OF INFORMATION WITH INTEGRATED CUSTOM PRINT-ON-DEMAND

(76) Inventor: Dimitrios Papaioannou, 4337 Renaissance Dr. #116, San Jose, CA (US) 95134

( * ) Notice: Subject to any disclaimer, the term of this patent is extended or adjusted under 35 U.S.C. 154(b) by 315 days.

(21) Appl. No.: 09/626,642

(22) Filed: Jul. 27, 2000

(51) Int. Cl.$^7$ .............................................. G06F 17/30
(52) U.S. Cl. ......................... 707/104.1; 707/10; 707/3
(58) Field of Search ........................ 707/3, 104.1, 10; 701/200

(56) References Cited

U.S. PATENT DOCUMENTS

| | | | |
|---|---|---|---|
| 4,973,952 A | 11/1990 | Malec et al. ................ | 345/700 |
| 5,461,371 A | 10/1995 | Matsumoto et al. ... | 340/825.25 |
| 5,929,848 A | 7/1999 | Albukerk et al. .......... | 340/5.91 |
| 6,336,072 B1 * | 1/2002 | Takayama et al. .......... | 701/200 |

FOREIGN PATENT DOCUMENTS

WO     WO 91/14984     10/1991

OTHER PUBLICATIONS

"Innovating adaptive and neural systems instruction with interactive electronic books ". Principe, J.C. Euliano, N.R. Lefebvre, W.C,; Comput. NeuroEng. Lab., Florida Univ., Gainesville, FL, USA ; Proceedings if the IEEE; On pp.: 81–95 ; Jan.*

* cited by examiner

*Primary Examiner*—Diane D. Mizrahi
(74) *Attorney, Agent, or Firm*—Brown & Michaels, PC

(57) ABSTRACT

A system delivering tour-related information to a person touring an area-of-interest, and enabling post-tour custom print-on-demand of a book containing information desired by the user, includes a network of fixed radio frequency transceivers each transmitting a signal unique to the point-of-interest near which it is located, and at least one mobile information storage and playback unit receiving such signal. The fixed transceivers are connected together through a local area network (LAN) which contains a server computer. When a mobile unit detects a signal generated by a fixed transceiver, it delivers information concerning the corresponding point-of-interest through a listening device to the user. In this way, the informational content delivered to the user corresponds to the point-of-interest the user is near. The user indicates his or her interest level relative to each point-of-interest he or she visits through use of keys on an enclosure of the mobile unit. The mobile unit transmits such indication to the nearest fixed transceiver which in turn forwards it to the LAN's server. The invented system subsequently uses these interest-level indications to print on demand a book customized to the user's interests.

22 Claims, 4 Drawing Sheets

DEVICE FOR LOCATION-DEPENDENT AUTOMATIC DELIVERY OF INFORMATION WITH INTEGRATED CUSTOM PRINT-ON-DEMAND

BACKGROUND OF THE INVENTION

Many areas-of-interest, such as museums, theme parks, zoos, archeological sites, or other educational or outdoor sightseeing locations, contain various features—or "points-of-interest"—suitable for showing to visitors. A point-of-interest, as used herein, may be a displayed article, a feature of an archeological or other outdoor site, or any similar feature or thing that a visitor may find of interest and wish to receive information about. The conventional approach for conducting tours of such areas-of-interest is primarily through human guides. When the guide reaches a point-of-interest, he or she delivers information concerning such point-of-interest to the group of visitors currently taking the tour. When the tour is over, the tour-takers often visit a gift shop containing souvenirs and books with information concerning the area-of-interest just seen.

The conventional approach to tour-taking has a number of drawbacks. First, timing restrictions are imposed, as the tours start at pre-specified times, and a pre-determined amount of time is devoted to each point-of-interest. Second, to receive information the participants must travel in a group and follow the tour guide. Third, the delivered information is typically not repeated for just one individual. Fourth, the tour is conducted in one or a few languages only, thus many times not meeting the needs of every individual. Fifth, the books offered by the gift shop are not customized to a given tour-taker's specific interests; consequently they may have, for a particular person, more information than desired on one topic, and less information than desired on another topic. Sixth, such books are usually available only in a limited number of languages and hence do not address the needs of all potential visitors; indeed, even if the books are in print in many languages, making the books available to visitors in all such languages could require the gift shop to incur prohibitively-high inventory costs.

FIELD OF THE INVENTION

The invention relates to a system for automatically delivering information to a person. More particularly, the invention pertains to a system for delivering to a person informational content which depends upon the location of the person within an area covered by the system, such that the person can subsequently request previously-selected information in print form to be delivered through the system's print-on-demand capability.

DESCRIPTION OF RELATED ART

The related art consists of systems for automatically delivering exhibit-related information to tourists, as well as shopping cart systems designed to convey to shopping-related information and advertisements to users in a store. These references are described below.

The invention disclosed by Albukerk and Waytena in U.S. Pat. No. 5,929,848, INTERACTIVE PERSONAL INTERPRETIVE DEVICE AND SYSTEM FOR RETRIEVING INFORMATION ABOUT A PLURALITY OF OBJECTS, provides a location-dependent information delivery system for tour takers which relies upon a set of fixed signal-emitters to inform the users' mobile units as to their present location with the area-of-interest. That system includes provision to the user of exhibit-related information in textual format, the ability to mark such text as the user is viewing it, and the ability to have the marked text printed out upon return of the mobile unit. The system of that invention, however, does not include an ability to store user interest levels relative to each point-of-interest for subsequent print on demand of a customized book whose contents may be materially different—for example, more in-depth and/or of a pictorial nature—than the information delivered to the user during the tour.

Matsumoto and Yamauchi, in U.S. Pat. No. 5,461,371, EXHIBIT EXPLAINING SYSTEM ACTIVATED BY INFRARED SIGNALS, also disclose a system for delivering informational content regarding objects of interest to individual users via a mobile unit which detects and identifies a signal of a fixed base unit near the point-of-interest. The mobile unit of that invention includes a printing means as an alternate method of communicating the information to the user rather than via audio or graphic display. The invention disclosed therein does not include an ability to designate interest levels regarding specific points of interest for later print-on-demand of a customized book.

An apparatus disclosed by Malec and Moser in U.S. Pat. No. 4,973,952, SHOPPING CART DISPLAY SYSTEM, like the above two patents, includes a display responsive to trigger signals provided by transmitters associated with a particular location. As the title suggests, the display is mounted on a shopping cart. The display delivers to the shopper advertising media associated with the user's location within the store. In one embodiment, the display includes a sensor for determining whether the information is displayed in the presence of a consumer, and a memory for storing all trigger signals received during a given shopping trip. The stored data is subsequently transmitted to a polling transceiver located at a point of sale register for later analysis.

Similar to the above, a portable device disclosed by Begum in Patent Cooperation Treaty Patent Application No. WO 91/14984//PCTIUS90/07128 —DEVICE FOR PROVIDING ADVERTISING TO SHOPPERS, accompanies a shopper during shopping in a store and displays advertising information and information regarding specials for products carried by the store. The advertising information is displayed periodically or in response to a trigger signal in the vicinity of the particular product concerned so a shopper receives the information as he or she approaches the product in question. In one embodiment, the device includes keys that a shopper can engage to determine the location of specific products.

SUMMARY OF THE INVENTION

The device of the present invention provides a system for conducting automatic tours by eliminating the need for a tour guide and for tour-takers to travel in groups. The invented system delivers independently to each person using it (hereinafter, "user") information associated with a point-of-interest or exhibited article when, and only when, the user equipped with a mobile unit of the invented system enters an area within which the point-of-interest or displayed article can be conveniently observed. The invented system also enables print-on-demand, typically at the book or gift shop associated with the area-of-interest, of a book customized to the user's interests. Each user independently selects the topics to be included in such a customized book, as well as the amount of material and the level of detail for each selected topic.

The invented system comprises a set of fixed transceivers located near the points-of-interest which transmit modulated signals at a certain radio frequency (RF). The invented system additionally comprises a set of mobile units, one for each user. Each mobile unit is equipped with a transceiver, a data storage device and a listening device such as a pair of headphones. When a mobile unit recognizes the signal of a fixed transceiver, it plays back the appropriate information file to the user through the listening device. All information files thus played back to the user are stored on the mobile unit.

The invented system optionally stores and delivers general information or advertising messages when the user is not in the region of any of the fixed transceivers. This feature may be activated or deactivated by programming a microprocessor unit (MPU) of the mobile unit. The delivery order of these general informational messages may be pre-specified, random, or causal. An example of causal delivery order is time-dependent delivery of information. In this case the mobile unit's MPU is programmed to monitor the unit's internal clock. For example, when lunch time is approaching and no modulation pattern has been identified for a specific period of time, the unit delivers to the user information about dining facilities near the area-of-interest covered by the system.

The invention provides the user with control over the stream of information delivered to him or her. During the playback of an information file the user can repeat, restart, skip-back or pause the playback process through corresponding keys located on an enclosure of the mobile unit. These keys relay the users' wishes to the MPU, which in turn directs the storage device to access and deliver the information stored in the appropriate segment of the file.

The invention further provides the user with extended control over the material of a custom-print book to be printed after the tour, if the user so chooses. During the tour the user relays to the system information about his or her level of interest relative to each point-of-interest observed. The system uses this information to determine how much material regarding each point-of-interest to include in the custom-print book.

The system delivers to users tour information in any language desired. This is accomplished by use of an audio CD, flash memory, flash memory cards or removable hard drives. Upon receipt of the mobile unit the user selects the language in which he or she wishes to receive the information. The mobile unit's MPU is programmed accordingly to use a look-up table whose entries indicate information files in the user's chosen language, thus causing the unit to deliver the information streams in that language. Alternatively, the mobile unit only stores one language at a time, and upon the user's designation of a desired language, the correct CD or other device is inserted into the unit to cause the information to be delivered in that language. In yet another embodiment, after the user designates a language, the device is coupled to the main server and files in the designated language are downloaded onto a writable storage device such as a hard disk of the mobile unit.

As noted, all the information dispensed to the user during the tour resides on the storage medium of the mobile unit. This feature of the invention keeps bandwidth requirements to a minimum and makes the system robust. Further, the system employs as building blocks components of well-entrenched technologies, resulting in low manufacturing costs. These and other aspects of the invention will be apparent from and elucidated with reference to the embodiments described hereinafter.

Although the invention is described as applied in an automatic tour system, it is useful in any application where location-dependent automatic delivery of information is beneficial.

DETAILED DESCRIPTION OF THE INVENTION

Figure 1:
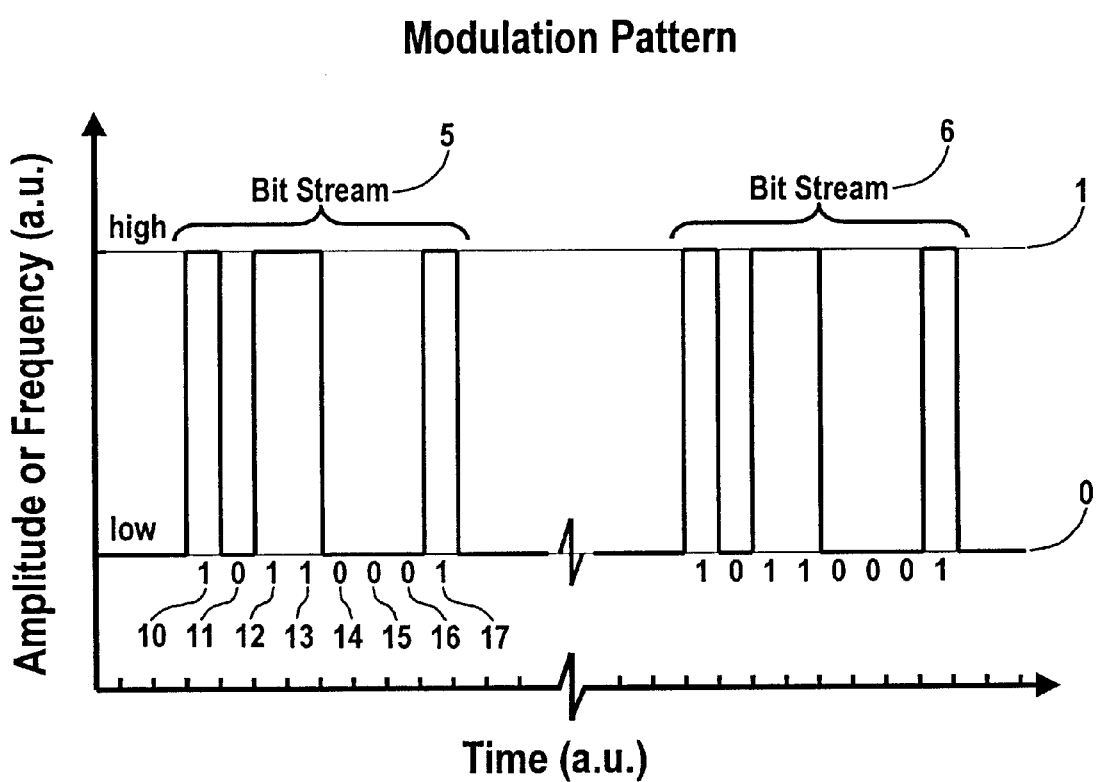
FIG. 1 shows the modulation pattern of a fixed transceiver of the invented system.

To assist in a better understanding of the invention, a specific embodiment of the present invention will now be described in detail. Although such is the preferred embodiment, it is to be understood that the invention can take other embodiments. This detailed description will include reference to FIGS. 1 through 4. The same reference numerals will be used to indicate the same parts and locations in all the figures unless otherwise indicated. It will be apparent to one skilled in the art that the present invention may be practiced without some of the specific details described herein. In other instances, well-known structures and devices are shown in block diagram form.

The invented system comprises a set of fixed transceivers, wherein one radiation frequency (RF) transceiver is located near each point-of-interest about which information is to be delivered to the user. All fixed transceivers have two channels. The one channel operates at a center frequency ($f_R$) and is used for receiving signals. The other channel operates at a center frequency ($f_T$) and is used for transmitting modulated signal. Referring to FIG. 1, this modulation is either amplitude modulation (AM) or frequency modulation (FM) around the center frequency $f_T$. With AM, the amplitude of the transmitted signal is varied between a low value (denoted with 0) and a high value (denoted with 1) and it follows a specific pattern of high and low amplitude values; with FM, the frequency of the fixed transceiver is shifted between a low value (denoted with 0) and a high value (denoted with 1). Accordingly, with either AM or FM, a specific digital code, or sequence of 0s and 1s, is transmitted, resulting in a modulation pattern uniquely identifying that fixed transceiver. Use of FM is preferred, as FM has a better signal-to-noise (S/N) ratio than AM.

It is to be noted that an infrared radiation (IR) signal can in some instances be used effectively in place of an RF signal. IR, however, requires a "line of sight" between emitter and receiver. In tour areas where people move around freely, such requirement could be problematic, as one user may block the beam to another user. This problem can be solved by mounting the fixed transceivers on a ceiling. IR is also problematic in open spaces with significant sunlight. Hence, use IR-based fixed transceivers is only advisable when indoors and a narrow, conical-shaped trigger region is desired. In such cases, IR is superior to RF, as with RF it is difficult to achieve a conical trigger region. Such a region is not typically required, however, and hence RF transmission is preferable to IR transmission.

Each fixed transceiver repeats its unique modulation pattern continuously after a specific interval of low value (i.e., 0). Such low-value interval is long enough to allow the mobile unit to detect it as such, but is preferably not so long that the mobile unit must wait an inordinate amount of time before receiving a repeat of the fixed transceiver's unique code. The minimum amount of time of such low-value interval depends upon the speed of the system and the number of bits used, which in turn is dependent upon the number of points-of-interest, as discussed below. If each bit is ten milliseconds (msec) long, for example, and ten bits are used, the modulation pattern is 100 msec long. In that event, a 200-msec low-value interval is ample. If cheaper components are used to build the system, however, each bit may be 50 msec long. In that event, low-value interval of approximately one second is needed.

In a slightly different embodiment of the invented system, the frequency of the transmitted signal is constant—that is, it is not varied between some high and low value as described in the previous paragraph. In this embodiment, the center frequency $f_T$ is different for all fixed transceivers. Such arrangement results in an analog code which uniquely identifies each fixed transceiver.

The signal level (i.e., radiation power) of each fixed transceiver is controlled independently and set appropriately. A higher signal levels results in a larger reception area within which the mobile unit is triggered and the information stream delivered to the user. Likewise, a lower signal level result in a smaller reception area. To ensure consistency of operation and a uniform experience for all users, the sensitivity of the mobile transceivers is preferably set to the same value on all mobile units.

Referring to FIG. 1, the modulation pattern of a fixed transceiver is depicted along a graph in which the X axis represents time and the Y axis represents either amplitude or frequency of the RF signal, depending on the type of modulation, AM or FM, respectively. As noted, the amplitude or frequency, as the case may be, varies between some low value 0 and some high value 1. Two consecutive bit streams 5 and 6 are shown. There is a substantial time interval separating each bit stream from the next to avoid confusion of the mobile unit while it attempts to identify the modulation pattern being received. Preferably, each bit stream consists of 8 bits. The first bit 10 is always set at a high value and identifies the beginning of a new bit stream. The remaining seven bits 11, 12, 13, 14, 15, 16, and 17 represent the modulation pattern that uniquely identifies the fixed transceiver. In this example, a 1-0-1- 1-0-0-0-1 modulation pattern is employed. Using a 7-bit modulation, a maximum of $2^7$ (=128) combinations can be achieved, and consequently, 128 different fixed transceivers (i.e. points-of-interest) can be identified. The modulation of the invented system is scalable and by adding bits more combinations can be achieved. For example, if 9 bits are used then $2^8$ (=256) different combinations can be achieved; if 10 bits are used then $2^9$ (=512) different combinations can be achieved, and so forth. The number of bits employed depends upon the number of points-of-interest covered by the system. Depending upon the needs of the particular application, more or fewer bits may be used in the modulation pattern of the fixed transceivers.

Figure 2:
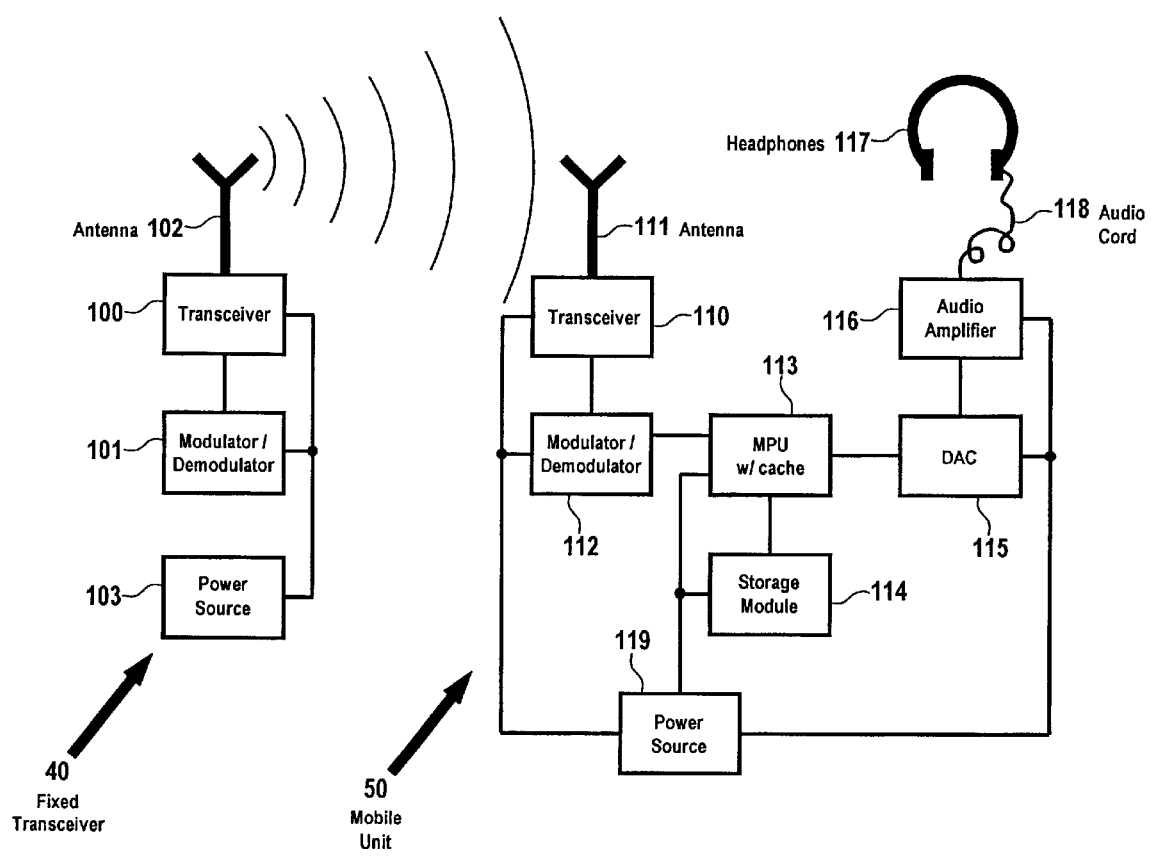
FIG. 2 shows the basic building blocks and architecture of the invented system.

Referring to FIG. 2, the invented system includes at least one fixed transceiver 40 and at least one mobile unit 50. The fixed transceiver 40 comprises a transceiver module 100 which is modulated by a modulator/demodulator 101 which produces an FM or AM modulation pattern as shown in FIG. 1. The modulated RF signal is transmitted via an antenna 102. The transceiver module 100 and the modulator/demodulator 101 are powered by a power source 103.

The mobile unit 50 is equipped with a mobile transceiver 110 which receives the modulated RF signal through an antenna 111. The RF signal is subsequently processed by a modulator/demodulator 112, which extrapolates (i.e., demodulates) the modulation pattern of the RF signal (if detectable) and forwards it to the microprocessor unit (MPU) 113.

If a modulation pattern is detected, the MPU 113 accesses a look-up table (not shown) located in the storage module 114. The look-up table contains one row for each fixed transceiver. Each row has two data fields: the first contains an indication of the transceiver's modulation pattern, and the second contains an indication of the corresponding information file. The "corresponding information file" is that file which contains data concerning the point-of-interest associated with the fixed transceiver.

Accordingly, the MPU 113 searches through the look-up table until it finds a row whose first field matches the modulation pattern detected. It then gleans from the second field an indication of the file whose contents should be delivered to the user. The MPU 113 then directs the storage module 114 to begin delivering the contents of the selected information file. Preferably, all information files are encoded using a digital compression format to save storage space. Preferably, that digital compression format is the MP3 digital compression format. The MP3 format has the advantage that it is a standard format allowing easy sharing of information, which in many cases further enables exposure and easy and/or free access to advertising data or general information to be played to the user when no fixed-transceiver identification signal is received, as discussed above. Notably, however, this "openness" of the MP3 compression format allows for the potential theft of the data in the files on the mobile units. Accordingly, if protection of such data is critical, then a more secure compression format should be used.

If the information file is compressed, the MPU 113 decompresses it. The MPU then delivers the contents of the information file—which is preferably a digital audio file—to a digital-to-analog converter (DAC) 115. The MPU 113 is equipped with sufficient cache memory to ensure the smooth flow of the data stream to the DAC 115.

The DAC 115 converts the contents of the information file to an analog audio signal which is filtered and amplified by an audio amplifier 116. The audio signal is delivered to the user via a set of headphones 117, which are connected to the output of the audio amplifier 116 by means of a cord 118.

When playback of the audio file is completed once (and the same modulation pattern, or no modulation pattern, is identified), the MPU 113 sets the mobile unit 50 in standby mode unless the user presses the restart key. If this key is pressed the MPU 113 directs the storage module 114 to deliver the contents of the audio file from the beginning. Preferably, the MPU stores an indication of the last file it played so that file can be played back to the user when the restart key is pressed, even if the modulated signal is no longer being detected by the mobile unit's transceiver.

During the playback process the MPU 113 constantly monitors the existence of the modulation pattern as well as the state of the control keys located on the mobile unit 50. If the user walks away from the fixed transceiver 40 such that a new modulation pattern is identified, the MPU 113 interrupts the playback of the audio file that is associated with the original point-of-interest and begins playback of an audio file associated with the new point-of-interest. If the user walks away from the fixed transceiver such that no modulation pattern is identified, the system continues to play the information file to completion or until the user presses a stop key on the mobile unit. When the user approaches another fixed transceiver and the signal level is sufficient to identify its modulation pattern, then the MPU is triggered and initiates playback of the corresponding audio file. The process is repeated as the user moves from the premise of one fixed transceiver (i.e. point-of-interest) to the premise of another. If no modulation pattern is identified within a period of time pre-programmed on the MPU, the MPU initiates playback of a general information audio file according to the pre-specified, random, or causal order with which the unit is pre-programmed.

If the user presses the restart key at any time during playback, the MPU 113 directs the storage module 114 to deliver the contents of the audio file from the beginning. If the user presses the pause key, the MPU 113 directs the storage module 114 to pause delivering the contents of the audio file; no audio information is heard through the set of headphones 117. If the user presses the pause key again, the MPU 113 directs the storage module 114 to resume delivering the contents of the audio file from the position at which playback was paused. If the user presses the skip-back key, the MPU 113 directs the storage module 114 to deliver the portion of the audio file beginning from a few seconds earlier. In one embodiment there is also skip-forward key that allows the user to skip over some of the information and have the remainder played back starting at a subsequent point. This is useful if the user is not very interested in the information being delivered, but expects that subsequent information concerning the same point-of-interest may be of more interest. All the above-mentioned keys provide control over the playback of audio files associated with either points-of-interest or general information.

The mobile unit also has buttons that when pressed indicate the user's level of interest in the information being delivered. Preferably, there are a "thumbs-up" key and a "thumbs-down" key for the user to so indicate. If the user presses these keys at any time while the mobile unit is delivering to the user an information file concerning a point-of-interest, the MPU 113 directs the mobile transceiver 110 to transmit a N+M-bit modulation pattern through the mobile unit's antenna 111. This modulation pattern is similar to the one transmitted by the fixed transceivers 40. The first N–1 bits of the modulation pattern uniquely identify the particular mobile unit 50, and the last (Nth) bit indicates either a "thumbs-up" or "thumbs-down." Preferably, the last bit's having a value of 1 indicates "thumbs-up" while 0 indicates "thumbs-down." The number of bits N is sufficient to uniquely identify all mobile units 50. The M bits that follow the first N bits uniquely identify the current point of interest for which the user indicated a "thumbs-up" or "thumbs-down" designation. Preferably, additional bits are employed for handshaking between the mobile units and the fixed transceivers in order to ensure delivery of the N+M-bit modulation pattern, as explained below.

Figure 3:
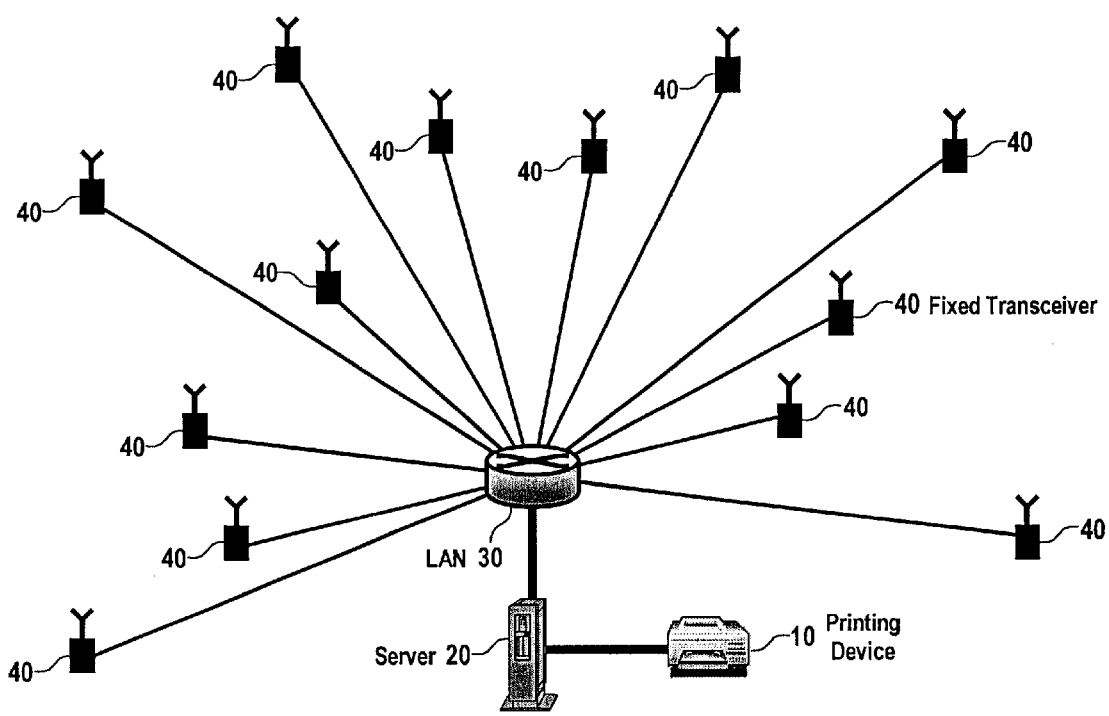
FIG. 3 shows the fixed transceiver network and the print-on-demand gear of the invented system.

Referring to FIG. 3, the fixed transceivers are all connected through a local-area network (LAN) 30 to a server 20, which is in turn coupled to a printing device 10. When a fixed transceiver 40 receives an N+M-bit modulation pattern indicating a "thumbs-up" or "thumbs-down," it delivers this information to the LAN 30. Due to the transmission of the M bits that follow the N bits, as described above, even if a fixed transceiver other than the one associated with the current point-of-interest detects the "thumbs-up" or "thumbs-down" signal, when such fixed transceiver forwards the interest-level designation to the server 20 through the LAN 30, the server 20 receives an accurate indication of the point-of-interest relative to which the user indicated "thumbs-up" or "thumbs-down." In addition, the handshaking bits prevent blind transmission of the N+M modulation pattern when the user is outside all reception regions. The mobile unit transmits the N+M modulation pattern only when handshaking was established with some fixed transceiver.

As noted, the "thumbs-up" and "thumbs-down" keystroke from the user is communicated through the LAN 30 to the server 20, on which a tracking program constantly records these keystrokes for each user. If a user presses the thumbs-up key more than once for the same point-of-interest, the tracking program interprets this as a higher interest level for the currently-viewed point-of-interest, for that user. The interest level for a particular point-of-interest equals a default level, preferably 1, plus the number of times the thumbs-up key is pressed minus the number of times the thumbs-down key is pressed. This way, if the user does not visit a particular point-of-interest, or visits it but does not press either the thumbs-up or thumbs-down key, the server records the default interest level. At the end of the tour, the tracking program has captured the user's interest level for each point-of-interest visited.

Upon return of the mobile unit, the user instructs the system to initiate printing of the print-on-demand book. Such instruction includes an indication of which mobile unit the user was using. Upon receiving such instruction, the tracking program transfers the recorded information about the user's preferences to the print-on-demand program, which preferably also runs on the server 20. The print-on-demand program selects the material to be included in the custom tour book based upon the user's interest level for each topic, and initiates printing on the printing device 10. The information placed into the custom-printed book preferably resides on the server device 20. It is more in-depth than that information delivered to the user during the tour. Moreover, while the information delivered to the user during the tour is audio in nature, the information that goes into the book contains text and graphics, including photographs where appropriate.

In an alternative embodiment, the mobile unit 50 does not transmit the preferences of the user to the fixed transceivers 40 (and subsequently to the LAN 30 and server 20). Instead, the interest-level indicia, as designated by the user during the tour, are stored locally in the storage module 114. Upon return of the mobile unit 50 the user requests the custom book to be printed. The mobile unit 50 then transfers the user interest-lever indicia to the server 20 (via direct connection), which stores detailed content regarding each point-of-interest in the form of text, graphics and pictures. Subsequently, the server 20 initiates printing of the custom tour book through the printing device 10.

In an alternate embodiment, the mobile unit 50 contains enough data storage capacity in its data storage module 114 to hold all the informational content to be placed in the print-on-demand book. In such embodiment, the interest-level indicia, as designated by the user during the tour, are not transmitted to the server 20 but instead remain stored on the mobile unit 50 until the book is printed. Upon return of the mobile unit 50 the user requests the custom book to be printed from the mobile unit 50. The mobile unit 50 either connects directly to the printing device 10 or sends the informational content for the book to the printing device 10 via the server 20.

Figure 4:
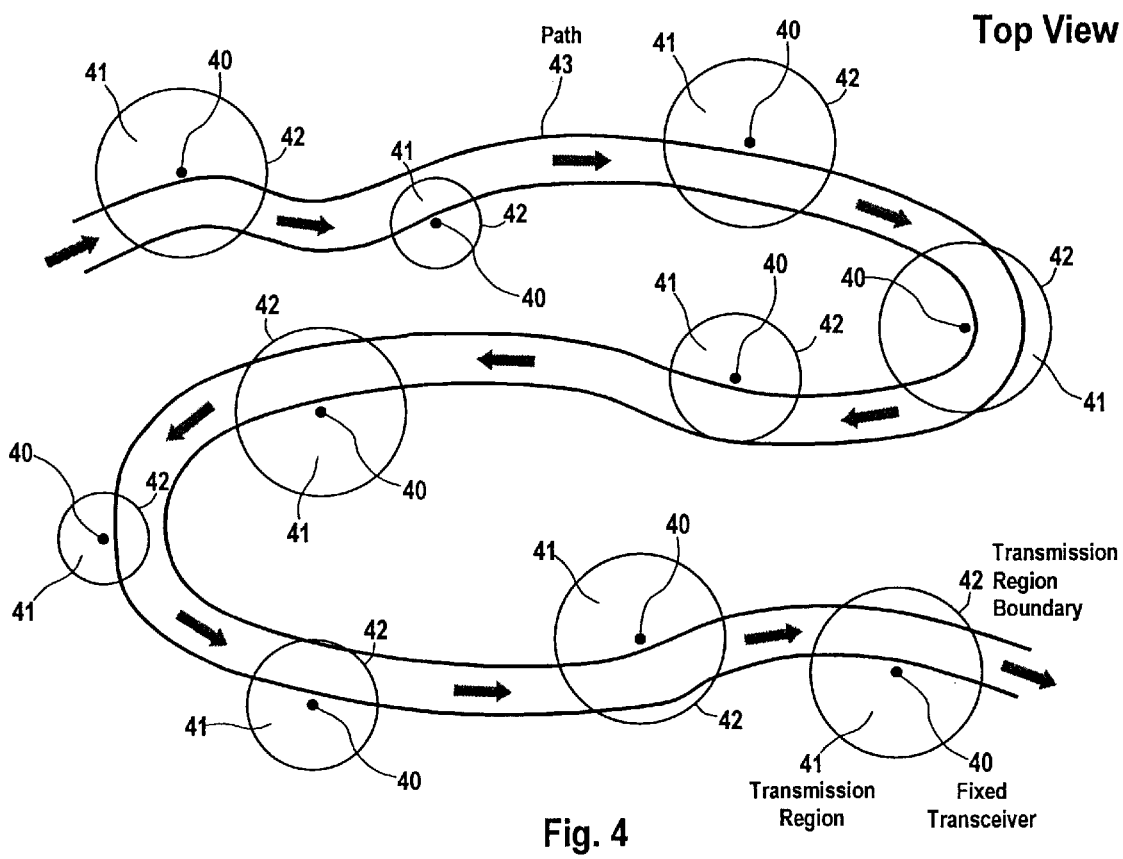
FIG. 4 shows a topology of several fixed transceivers in an area covered by the invented system.

Referring to FIG. 4, pursuant to a topology of fixed transceivers 40 in the area covered by the system, each fixed transceiver 40 is positioned substantially close to its corresponding point-of-interest and has a transmission region 41 within which recognition of its modulation pattern by the mobile units is possible. The boundary 42 of the transmission region 41 is controlled separately for each fixed transceiver 40 by adjusting the transceiver's transmission power. The size of the transmission region 41 need not be the same for all fixed transceivers 40. Some transmission regions 41 may be larger and others may be smaller, depending upon the needs of each application. The transmission power level of each fixed transceiver 40 is such that its transmission region 41 does not merge with the transmission region 41 of any other fixed transceiver 40. This ensures that the each mobile unit 50 identifies at most one modulation pattern at a time. Furthermore, substantial space is left outside each transmission region boundary 42. This ensures that while outside of a transmission region 41 a mobile unit 50 delivers to its user only general information or advertising messages.

The points-of-interest are located along a path 43. The path 43 may be a physical path, as determined by the user as he or she walks from one point-of-interest to the next closest point-of-interest. Alternatively, the path 43 may be a logical path. In this regard, the term "logical path" refers to a sequence of points-of-interest that the user is given at the time he or she obtains the mobile unit 50. In such a case, the operator of the area-of-interest provides the user with a logical path that facilitates the smooth flow of users in the area-of-interest. In deriving the logical path, the operator takes into account show schedules at specific points-of-interest, as in the case of theme parks, and attempts to avoid congestion at the points-of-interest. Of course, the logical path does not necessarily correspond to the physical path the user might have taken by moving from one point-of-interest to the next—and physically closest—point of interest. Notably, while such a logical path 43 helps ensure the smooth flow of the visitors and helps avoid congestion in the area-of-interest, it is not an essential component of the invented system.

In a preferred embodiment, the invented system delivers tour information in any language desired. Preferably, an audio CD player is employed as a storage device and the appropriate CD is placed in the mobile unit upon receipt of the unit. There are as many different CDs as languages supported by the system. Alternatively, flash memory is employed as a storage medium; in that case, audio files of the appropriate language are downloaded to the unit prior to its receipt. A still alternative solution is to use removable flash memory cards such as those used for digital cameras, which are installed on the mobile unit prior to its receipt.

Still another possibility is to employ a hard disk drive as a storage medium, in which case several options exist for delivering the information in the language desired. If the hard drives are removable, then a similar procedure to that followed for CDs can be used for language selection. Alternatively, since hard drives have substantially higher capacities that CDs and flash memory, multiple files can be stored for each point-of-interest, one such file for each supported language. In that case, multiple look-up tables are stored, one for each language. Upon receipt of the mobile unit the MPU is programmed to use the appropriate look-up table, thus causing the mobile unit to deliver information streams corresponding to the selected language. Finally, if the mobile units are coupled to the server prior to dispensing them to users, then when the user selects a language the server downloads the appropriate-language files onto the mobile unit's hard-drive to be used during the tour.

The MPU controls the components of the mobile unit. Power to the mobile unit is provided by a set of batteries. Preferably, these batteries are rechargeable, and when the mobile unit is not in use it is connected to a base-unit that recharges the batteries. If a writable storage device is used, the base unit preferably also provides access to the storage device for downloading or updating the information files and lookup-tables.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A system for retrieving and delivering to a user taking a tour of an area-of-interest an information stream about a plurality of points-of-interest within an area-of-interest, comprising:

a) a server device for storing information concerning said points-of-interest and for causing generation of a print-on-demand book;

b) a plurality of point-of-interest identification devices coupled to said server device, each such identification device being assigned to a corresponding one of said points-of-interest, being disposed in an area from which said corresponding point-of-interest can be observed, and transmitting a point-of-interest identification signal identifying said corresponding point-of-interest, each comprising:

i) means for transmitting said point-of-interest identification signal;

ii) means for receiving interest-level indicia for said corresponding point-of-interest; and iii) means for communicating said interest level indicia to said server device;

c) a plurality of portable devices for delivering said information stream to said user, each comprising:

i) means for receiving said point-of-interest identification signals;

ii) means for transmitting interest-level indicia;

iii) a storage device for storing point-of-interest information concerning said points-of-interest, said information for each point-of-interest being associated in said storage device with one point-of-interest identification signal;

iv) an audio output device adapted to output audio data in said point-of-interest information stored on said storage device;

v) processing means coupled to said receiving means, said storage device and said audio output device, retrieving from said storage device point-of-interest information associated with said point-of-interest identification signal received by said receiving means, and conveying said retrieved point-of-interest information as said information stream to said audio output device;

vi) a playback-control device coupled to said processing means, having a plurality of playback-control components engageable by said user, each corresponding to a playback command, and responding to an engagement of one of said playback-control components by communicating to said processing means indicia of said engaged playback-control component, such that said processing means modifies delivery of said point-of-interest information to conform with said corresponding playback command; and vii) an interest-level-designation device coupled to said interest-level indicia transmitting means, having a plurality of interest-level-designation components engageable by said user, each corresponding to an interest-level designation in a set of interest-level designations, and responding to an engagement of one of said interest-level-designation components by communicating to said interest-level indicia transmitting means indicia of said engaged interest-level-designation component, such that said interest-level indicia transmitting means responds by transmitting a signal identifying a mobile unit of which said interest-level-designation device is a part, said corresponding point-of-interest, and said interest-level indicia; and d) printing means coupled to said server device, for printing on demand said customized book, such that each portable device delivers to said user said information stream when said user brings said portable device into an area within which said user can conveniently observe said point-of-interest, and said printing means, when said user finishes said tour, prints a book customized according to said transmitted interest-level indicia.

2. The system of claim 1 wherein said set of interest-level designations is a set which includes a designation of increased interest level and a designation of decreased interest level, or a set which includes a plurality of designations each corresponding to a different number.

3. The system of claim 1 wherein said playback-control components comprise a restart component which, when engaged, causes delivery of said information stream to be interrupted and then restarted from a beginning of said information stream; and a skip-back component which, when engaged, causes delivery of said information stream to be interrupted and then restarted from a point in said stream earlier than a current point but later than said beginning.

4. The system of claim 1 wherein said point-of-interest identification signal is transmitted via a form of radiation selected from the group consisting of infra-red radiation, non-modulated substantially-constant-frequency radio wave radiation, amplitude-modulated radio wave radiation, and frequency-modulated radio wave radiation.

5. The system of claim 1 wherein said interest-level-designation device is coupled to said interest-level-indicia transmitting means by being coupled to said processing means, wherein said processing means is coupled to said interest-level-designation device.

6. The system of claim 1 wherein said storage device is selected from the group consisting of a compact-disk drive, a hard disk drive, and a flash memory drive.

7. The system of claim 1 wherein said information for each point-of-interest is stored in a plurality of available languages, further comprising a means for said user to select a desired language, wherein after said user makes said selection said information stream is delivered to said user in said desired language.

8. The system of claim 3 wherein said playback-control components further comprise a pause component which, when engaged, causes delivery of said information stream to be paused if said delivery was not paused, and a resume component which, when engaged, causes said delivery to be resumed if said delivery was paused, wherein said pause component and said resume component are optionally one component.

9. The system of claim 3 wherein said playback-control components further comprise a skip-forward component which, when engaged, causes delivery of said information stream to be interrupted and then restarted from a point in said stream later than a current point but earlier than an end.

10. The system of claim 7 wherein said information is stored in said available languages on said storage device.

11. The system of claim 7 wherein said information is stored in at least one language on said storage device, further comprising a means of downloading to said storage device information in said desired language.

12. A system for retrieving and delivering to a user an information stream about a plurality of points-of-interest within an area-of-interest, comprising:

a) a server device for storing information concerning said points-of-interest and for causing generation of a print-on-demand book;

b) a plurality of point-of-interest identification devices, each such identification device being assigned to a corresponding one of said points-of-interest and being disposed in an area from which said corresponding point-of-interest can be observed, and transmitting said point-of-interest identification signal, each comprising means for transmitting a point-of-interest identification signal identifying said corresponding point-of-interest;

c) a plurality of portable devices for delivering said information stream to said user and storing said user's interest level concerning each one of said points-of-interest, each comprising:

i) means for receiving point-of-interest identification signals, each signal identifying one of said points-of-interest;

ii) a storage device for storing point-of-interest information concerning said points-of-interest, said information for each point-of-interest being associated in said storage device with one point-of-interest identification signal;

iii) an audio output device adapted to output audio data in said point-of-interest information stored on said storage device;

iv) processing means coupled to said receiving means, said storage device and said audio output device, retrieving from said storage device point-of-interest information associated with said point-of-interest identification signal received by said receiving means, and conveying said retrieved point-of-interest information as said information stream to said audio output device;

v) a playback-control device coupled to said processing means, having a plurality of playback-control components engageable by said user, each corresponding to a playback command, and responding to an engagement of one of said playback-control components by communicating to said processing means indicia of said engaged playback-control component, such that said processing means modifies delivery of said point-of-interest information to conform with said corresponding playback command;

vi) means for storing interest-level indicia;

vii) an interest-level-designation device coupled to said interest-level indicia storage means, having a plurality of interest-level-designation components engageable by said user, each corresponding to an interest-level designation in a set of interest-level designations, and responding to an engagement of one of said interest-level-designation components by communicating to said interest-level indicia storage means indicia of said engaged interest-level-designation component, such that said interest-level indicia storage means responds by storing a correlation between an interest level corresponding to said interest-level designation and said corresponding point-of-interest; and viii) means for communicating said correlations to said server device; and d) printing means coupled to said server device, for printing on demand said customized book, such that each portable device delivers to said user said information stream when said user brings said portable device into an area within which said user can conveniently observe said point-of-interest, and said printing means, when said user finishes said tour and causes said mobile unit to communicate said correlations to said server device via said communicating means, prints a book customized according to said interest-level designations.

13. The system of claim 12 wherein said set of interest-level designations is a set which includes a designation of increased interest level and a designation of decreased interest level, or a set which includes a plurality of designations each corresponding to a different number.

14. The system of claim 12 wherein said playback-control components comprise a restart component which, when engaged, causes delivery of said information stream to be interrupted and then restarted from a beginning of said information stream; and a skip-back component which, when engaged, causes delivery of said information stream to be interrupted and then restarted from a point in said stream earlier than a current point but later than said beginning.

15. The system of claim 12 wherein said point-of-interest identification signal is transmitted via a form of radiation selected from the group consisting of infra-red radiation, non-modulated substantially-constant-frequency radio wave radiation, amplitude-modulated radio wave radiation, and frequency-modulated radio wave radiation.

16. The system of claim 12 wherein said interest-level-designation device is coupled to said interest-level-indicia storage means by being coupled to said processing means, wherein said processing means is coupled to said interest-level-designation device.

17. The system of claim 12 wherein said storage device is selected from the group consisting of a compact-disk drive, a hard disk drive, and a flash memory drive.

18. The system of claim 12 wherein said information for each point-of-interest is stored in a plurality of available languages, further comprising a means for said user to select a desired language, wherein after said user makes said selection said information stream is delivered to said user in said desired language.

19. The system of claim 14 wherein said playback-control components further comprise a pause component which, when engaged, causes delivery of said information stream to be paused if said delivery was not paused, and a resume component which, when engaged, causes said delivery to be resumed if said delivery was paused, wherein said pause component and said resume component are optionally one component.

20. The system of claim 14 wherein said playback-control components further comprise a skip-forward component which, when engaged, causes delivery of said information stream to be interrupted and then restarted from a point in said stream later than a current point but earlier than an end.

21. The system of claim 18 wherein said information is stored in said available languages on said storage device.

22. The system of claim 18 wherein said information is stored in at least one language on said storage device, further comprising a means of downloading to said storage device information in said desired language.

* * * * *